(12) United States Patent
Helldin

(10) Patent No.: US 6,331,106 B1
(45) Date of Patent: *Dec. 18, 2001

(54) INSULATED SPRUE BUSHING

(75) Inventor: Carl E. Helldin, Skara (SE)

(73) Assignee: Nils Helldin AB, Skara (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,764

(22) Filed: Dec. 4, 1998

(30) Foreign Application Priority Data

Dec. 5, 1997 (SE) .................................. 9704540

(51) Int. Cl.⁷ ................................... B29C 45/20
(52) U.S. Cl. .......................................... 425/549
(58) Field of Search ............................... 425/549

(56) References Cited

U.S. PATENT DOCUMENTS 4,638,849 * 1/1987 Whitehorn ........................... 164/311
5,180,594    1/1993 Trakas .

FOREIGN PATENT DOCUMENTS 0 453 894    10/1991 (EP) .
0 620 096    10/1994 (EP) .
4-288205  * 10/1992 (JP) .

OTHER PUBLICATIONS

Bopp, H., "Heisskanalsysteme für technische Thermoplaste" *Plastverarbeiter*, vol. 28, No. 12 (1977) pp. 649–654.
Munakata, N., "Hot Nozzle Structure of Injection Molding Machine" *Patent Abstracts of Japan* (Abstract).

* cited by examiner

*Primary Examiner*—Tim Heitbrink
(74) *Attorney, Agent, or Firm*—Pillsbury Winthrop LLP

(57) ABSTRACT

A device useful for injection molding of thermoplastic material includes a sprue bushing. The sprue bushing, which may include a front piece, improves the possibilities to reduce the heat dissipation from the thermoplastic material to the material in and adjacent to the tip of the bushing and the wear of the material of the bushing is reduced. An insert bushing of ceramic material may also be present at the tip of the sprue bushing/front piece.

17 Claims, 4 Drawing Sheets

INSULATED SPRUE BUSHING

FIELD OF THE INVENTION

The present invention is for a device for use in injection molding of thermoplastic materials with a hot-runner in equipment with a sprue bushing.

BACKGROUND AND SUMMARY OF THE INVENTION

This general type of device is often used with tools which have several cavities for simultaneous molding of several pieces of goods which are usually identical, but may also be different. It is desirous both to reduce the amount of material wasted as much as possible, and to attain the shortest possible injection molding cycle time. Molds of this kind may be designed with a common inlet channel, a sprue, which branches into small runners, one for each cavity. In order to reduce the flow length in cold steel, the sprue may be substituted by a heated sprue bushing. Further improvements may be achieved by distributing the flow of material to two or more sprue bushings in a hot channel manifold. The best result is achieved if there is an individual sprue bushing for each single mold cavity. The sprue bushing may include, among other features, a front piece and a heating element.

In order to keep the cycling times as short as possible and to avoid overheating of the plastic material, it is desired that the temperature of the material be maintained steady and as low as possible. This is partly attained by the above described sprue bushings which are heated by electrical resistance elements on the outside of each. Temperature conditions are attained and control of the elements is by means of thermocouples or other temperature sensors. Further improvement is achieved by insulating the sprue bushings from surrounding metallic materials. Ceramic insulating material has proven to be suitable.

When injection molding using the above mentioned methods, it is essential that the temperature of the material at the inlet to the mold cavity be high enough so that the material will flow into and spread within the mold cavity, without being so high that the material will be damaged. At the same time it is desirous to keep the temperature low enough so that the material will solidify rapidly inside the mold so that the product may be discarded and another cycle of operation started.

The temperature at the tip of the ingot will then be crucial.

An object of the present invention is a means of sprue bushings which will further improve the possibilities to reduce the transfer of heat from the thermoplastic material to the material in and at the tip of the bushing. It is a further object to reduce the wear of the material of the bushing.

BRIEF DESCRIPTION OF THE SEVERAL VIEWS OF THE INVENTION

The invention will below be described more in detail with reference to the embodiments that are shown in the enclosed drawings.

DETAILED DESCRIPTION OF THE INVENTION

Figure 1:
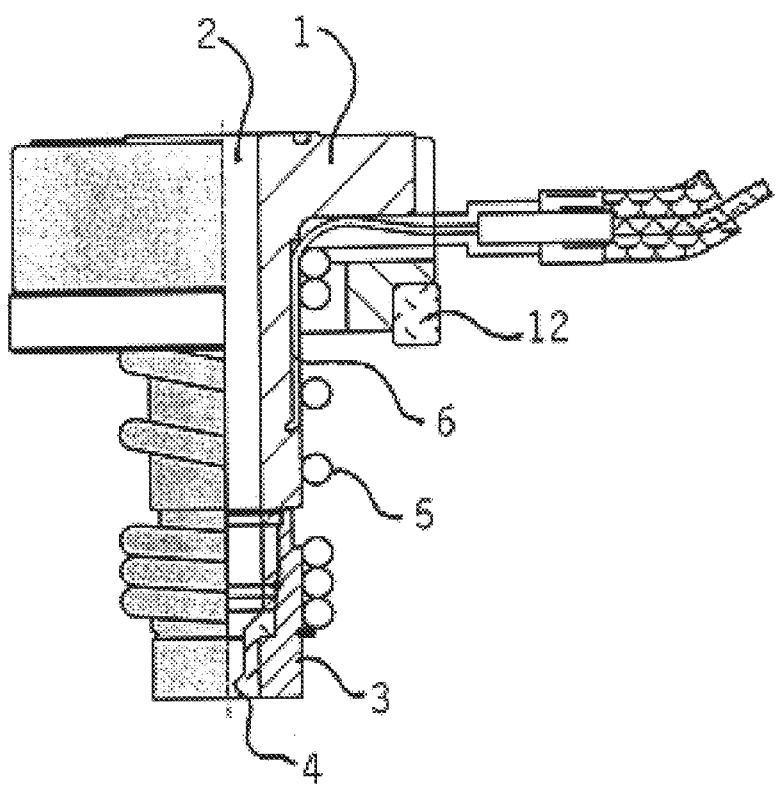
FIG. 1 shows a partial cross-section view of a sprue bushing according to the invention.

The sprue busing comprises a body 1 which preferably is made from steel. The body 1 is mounted into the mold and is thermally insulated from the mold by an insulating ring 12, preferably made from ceramic material. As shown in FIG. 1, the bushing extends downwards inwards into the mold, and terminates with front piece 3, 7 which is fixed to the bushing body 1. The sprue bushing is heated by an electrical element 5 which is wound around the body of the bushing and the front piece. The pitch of the winding is varied in order to acheive the best possible heat distribution. The temperature is monitored and controlled by means of a thermocouple 6. The front piece has at the bottom surface which faces the mold outlet opening or inlet 13, 14 through which the thermoplastic material is pressed into the mold cavity.

Figure 5:
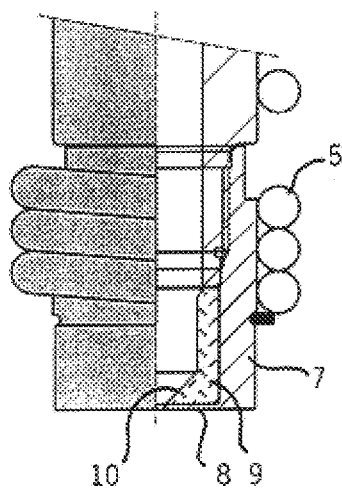
FIG. 5 shows a partial cross-sectional view of another embodiment of the front part of the sprue bushing.
Figure 6:
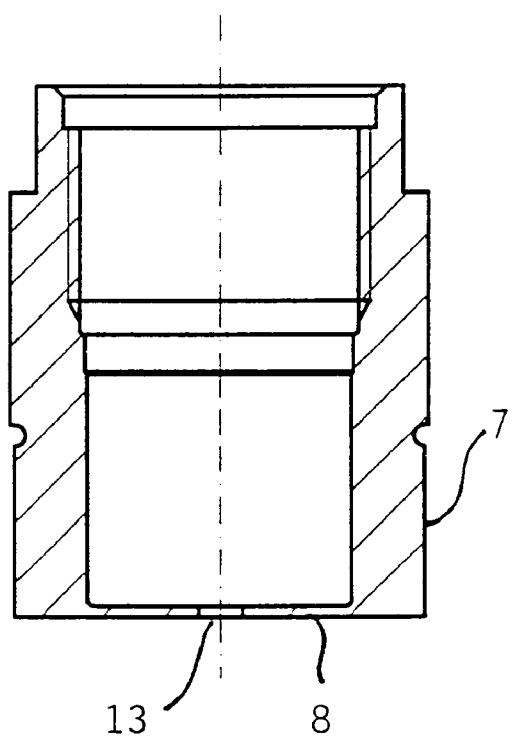
FIG. 6 shows a sectional view of the outer, front part of the bushing of FIG. 5.
Figure 7:
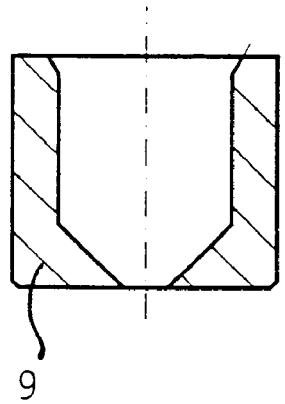
FIG. 7 shows a sectional view of an insert to the bushing of FIG. 6.

In order to further reduce the dissipation of heat to surrounding goods, to increase the precision of the temperature of the material and to increase the wear resistance of the sprue bushing, an insert bushing 9 made from ceramic material is provided closest to the tip of the front piece at the outlet opening 13, as shown in the embodiment of FIGS. 5–7. The bushing 9 has an inward sloping surface 10 closest the outlet opening 13 of the bushing. In this embodiment, the sprue bushing and the front piece are closest to the mold cavity delimited by a bottom 8 made from steel of the smallest possible thickness. The bottom 8 may be advantageous when heat is dissipated through it, and the cooling of the material in the outlet opening is sped up, so that the time of the operatiing cycle may be reduced.

Figure 2:
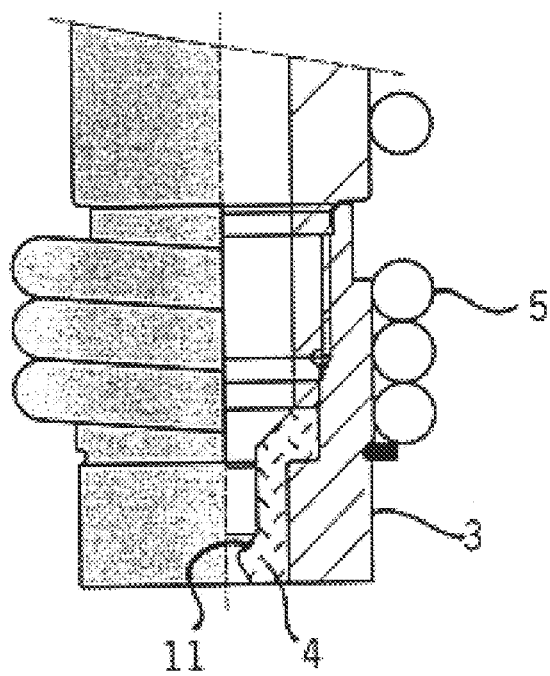
FIG. 2 shows a partial cross-sectional view of a portion of the bushing of FIG. 1.
Figure 3:
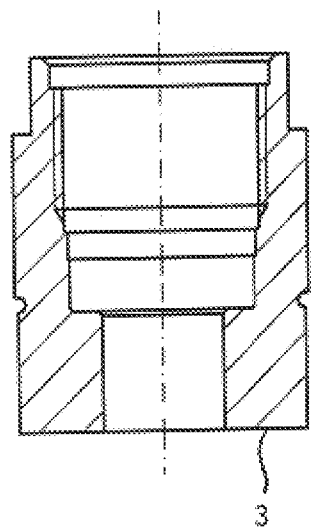
FIG. 3 shows a sectional view of the outer, front part of the sprue bushing.
Figure 4:
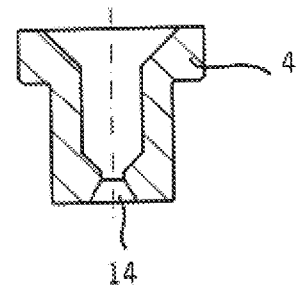
FIG. 4 shows a sectional view of an insert for the front part shown in FIG. 3.

In another embodiment of the invention in accordance with FIGS. 2–4, the insert bushing 4 is also a bottom surface of the sprue bushing and the front piece so that the heat transfer in this region is further reduced as compared to the above described embodiment. The insert bushing 4 has a shoulder 11 which reduces the open area of the passage through the bushing. In both cases, the advantages which come from the ability of the ceramic material to withstand wear better than steel are attained inside the flow paths.

Other embodiments of the invention are possible within the frame of the inventive idea, especially in respect of the outer shape and the shape of the internal channel of the ceramic insert bushings. Also the tip of the sprue bushing and the front piece may be designed in various ways in order to be adapted to the ceramic inserts.

Figure 8:
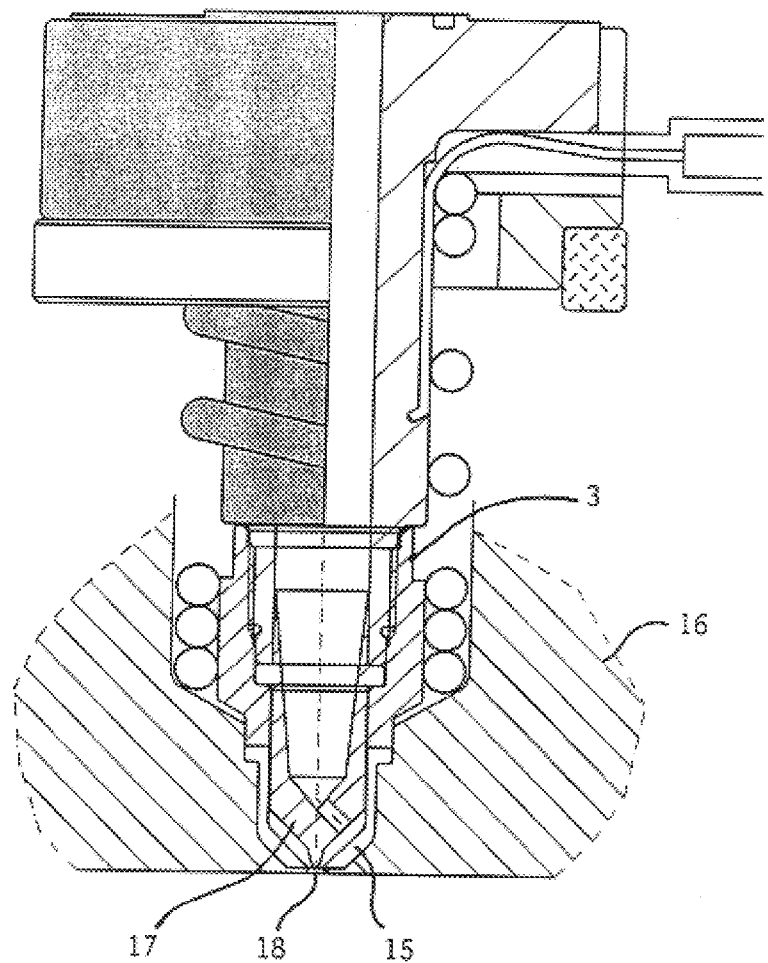
FIG. 8 shows a partial cross-sectional view of a further embodiment of the invention.

In the embodiment of the invention shown in FIG. 8, a ceramic bushing 15 is positioned in the mold 16. The front piece 3 has a lower part 1 which extends itself downwards to an opening 18 in the ceramic bushing and the mold into the mold cavity. The front piece 3 has a small direct contact surface at the mold 16 in order to obtain support of the bushing as required. In variations of this embodiment the ceramic bushing 15 may be extended upwards so far that there is no direct contact between metallic material of the sprue bushing/the front piece and the mold. The material flows through the lower part 17 of the bushing into the channel which is defined by the inside of the ceramic bushing 15 and the lower defining surface at the tip of the front piece.

Other embodiments of the invention are possible within the frame of the inventive idea, especially in respect of the outer shape and the shape of the internal channel of the ceramic insert bushings. Also the tip of the sprue bushing and the front piece may be designed in various ways in order to be adapted to the ceramic inserts.

What is claimed is:

1. A device useful for injection molding of thermoplastic material, comprising:
   a sprue bushing defining an outlet opening which is also adapted to be an inlet opening of a mold cavity;
   a ceramic bushing having defined therein a flow channel for thermoplastic material, wherein the ceramic bushing is arranged at the outlet opening of the sprue bushing, and is adapted to insulate the thermoplastic material in the flow channel and to reduce dissipation of heat from the thermoplastic material.

2. The device according to claim 1, wherein the ceramic bushing forms a part of the sprue bushing and comprises a contacting surface to contact with a wall of a mold cavity defined within a mold.

3. The device according to claim 1, further including a mold having a mold cavity defined therein, wherein the ceramic bushing is mounted into the mold cavity such that at least one contacting surface of the mold is in communication with the sprue bushing.

4. A device useful for injection moldinig of thermoplastic material, comprising:
   a sprue bushing including a front piece fixed to the sprue bushing defining an outlet opening; and
   a ceramic bushing having defined therein a flow channel for thermoplastic material, wherein the ceramic bushing is arranged at the outlet opening of the sprue bushing and is adapted to insulate the thermoplastic material in the flow channel and to reduce dissipation of heat from the thermoplastic material.

5. The device according to claim 4, wherein the ceramic bushing forms a part of the front piece of the sprue bushing, and defines a contacting surface to contact a wall of a mold cavity when the device is inserted into the mold.

6. The device according to claim 5, wherein the front piece includes a bottom portion which is provided in direct contact with the mold when the device is inserted into the mold.

7. The device according to claim 4, further including a mold having a mold cavity defined therein, wherein the ceramic bushing is mounted into the mold cavity such that at least one contacting surface of the mold is in communication with the front piece.

8. The device according to claim 4, wherein the sprue bushing is made from steel.

9. The device according to claim 4, further including a heating element wound about the sprue bushing for heating the sprue bushing.

10. The device according to claim 9, wherein a pitch of the winding of the heating element about the sprue bushing including the front piece is varied.

11. The device according to claim 9, further including a temperature sensing element to monitor and control a temperature condition of the heating element.

12. The device according to claim 11, wherein the temperature sensing element is a thermocouple.

13. The device according to claim 4, wherein the device further includes an insulating ring disposed around the sprue bushing to thermally insulate the sprue bushing from a mold when the device is mounted into the mold.

14. The device according to claim 13, wherein the insulating ring is formed from a ceramic material.

15. A devuce useful for injection molding of thermoplastic material, comprising:
    a sprue bushing including a front piece fixed to the sprue bushing defining an outlet opening; and
    a ceramic bushing having defined therein a flow channel for thermoplastic material, wherein the ceramic bushing is arranged at the outlet opening of the sprue bushing and is adapted to insulate the thermoplastic material in the flow channel and to reduce dissipation of heat from the thermoplastic material, and the front piece includes a bottom portion which is provided in direct contact with the mold when the device is inserted into the mold.

16. The device according to claim 15, wherein the bottom portion is made from steel and is adapted to dissipate heat from the thermoplastic material and to speed cooling of the thermoplastic material in the outlet opening of the front piece.

17. A device useful for injection molding of thermoplastic material, comprising:
    a sprue bushing defining an outlet opening which is also adapted to be an inlet opening of a mold cavity;
    a ceramic bushing having defined therein a flow channel for thermoplastic material, wherein the ceramic bushing is arranged at the outlet opening of the sprue bushing, and is adapted to insulate the thermoplastic material in the flow channel and to reduce dissipation of heat from the thermoplastic material, and the sprue bushing has a bottom portion formed of metallic material which is positioned against a mold when the device is inserted into the mold cavity.

* * * * *